United States Patent [19]
Matsuno

[11] Patent Number: 6,092,882
[45] Date of Patent: Jul. 25, 2000

[54] BRAKING FORCE CONTROL SYSTEM AND THE METHOD THEREOF

[75] Inventor: Koji Matsuno, Kasakake, Japan

[73] Assignee: Fuji Jukogyo Kabushiki Kaisha, Tokyo, Japan

[21] Appl. No.: 08/999,600

[22] Filed: Jan. 7, 1998

Related U.S. Application Data

[62] Division of application No. 08/690,844, Aug. 1, 1996.

[51] Int. Cl.$^7$ ........................................ B60T 8/58
[52] U.S. Cl. ......................... 303/146; 303/140; 303/148; 303/150
[58] Field of Search ................... 303/140, 146, 303/147, 148, 150

[56] References Cited

U.S. PATENT DOCUMENTS

| | | | |
|---|---|---|---|
| 4,998,593 | 3/1991 | Karpopp et al. | 303/146 |
| 5,344,224 | 9/1994 | Yasuno | 303/146 |
| 5,428,532 | 6/1995 | Yasuno | 303/146 |
| 5,700,073 | 12/1997 | Hiwatashi et al. | 303/146 |
| 5,735,584 | 4/1998 | Eckert | 303/140 |
| 5,882,092 | 3/1999 | Koibuchi | 303/140 |

FOREIGN PATENT DOCUMENTS 270561  3/1990  Japan .

*Primary Examiner*—Matthew C. Graham
*Attorney, Agent, or Firm*—Martin A. Farber

[57] ABSTRACT

A braking force control system and method of a vehicle comprises a steering angle detecting section for detecting a steering angle, a vehicle speed detecting section for detecting a vehicle speed, an actual yaw rate detecting section for detecting an actual yaw rate, a target yaw rate calculating section for calculating a target yaw rate, a target yaw rate restricting section for restricting the target yaw rate to an upper limit value, a yaw rate deviation calculating section for calculating a yaw rate deviation of the actual yaw rate and the target yaw rate, a target braking force calculating section for calculating a target braking force, a braking wheel determining section for determining a braking wheel, an output judging section for judging whether the yaw rate deviation is in a control zone or in a noncontrol zone. When the output judging section judges that the yaw rate deviation is in the control zone, a brake signal outputting section sends a signal to a brake drive apparatus so as to apply the target braking force to the braking wheel and when the output judging section judges that the yaw rate deviation is in the noncontrol zone, the brake signal outputting section sends a brake signal to the brake drive apparatus so as to apply no brake, whereby the vehicle can make a smooth and stable turn even in a case where a vehicle driver turns a steering wheel excessively during cornering.

13 Claims, 11 Drawing Sheets

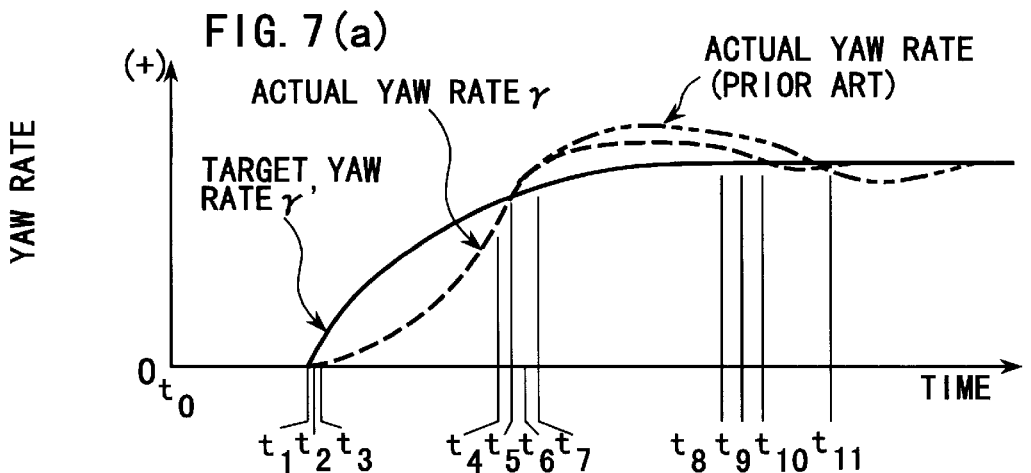
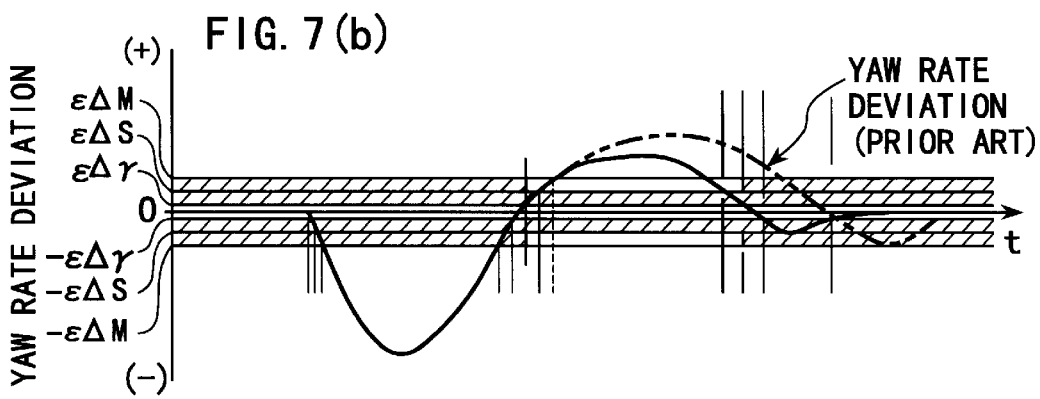
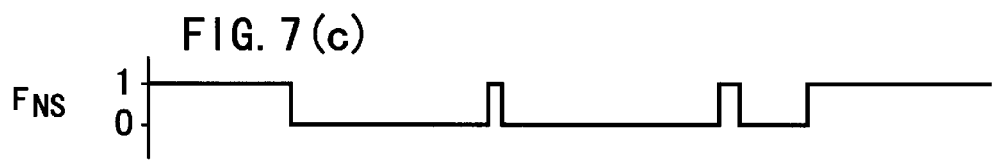
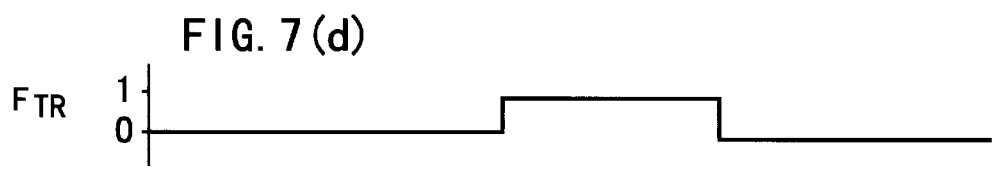
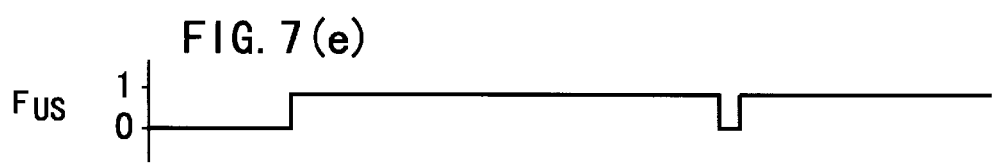
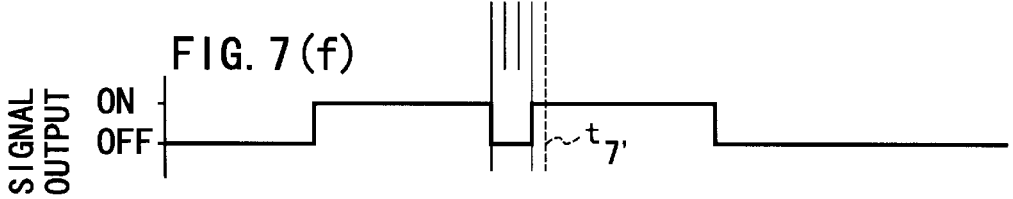

BRAKING FORCE CONTROL SYSTEM AND THE METHOD THEREOF

RELATED APPLICATION

This is a divisional application of my co-pending application Ser. No. 08/690,844 filed Aug. 1, 1996 under 35 USC 120, which co-pending application is hereby incorporated herein by reference.

BACKGROUND OF THE INVENTION

1. Field of the Invention

The present invention relates to a braking force control system and method of a vehicle for properly applying braking force to wheels so as to make a stable and smooth turn at cornering.

2. Prior Art

In recent years, due to an increasing concern about vehicle safety, so many techniques for securing safe driving have been developed. Among them, there are several proposed technologies in which when a vehicle turns corners, an optimally controlled braking force is applied to wheels based on data of vehicle driving conditions for accomplishing a stable and smooth cornering of the vehicle.

For example, Japanese Unexamined Patent Application Toku-Kai-Hei 2-70561 discloses a braking force control apparatus for controlling braking force on the basis of a yaw rate or an angular velocity of yawing, i.e., a rotational motion about a vertical axis passing through a center of gravity of the vehicle. In this technology, it is judged whether the vehicle is turning in an under-steer condition or in an over-steer condition with respect to a target yaw rate by comparing an actual yaw rate with the target yaw rate and if the vehicle is in under-steer condition a braking force is applied to inner wheels (wheels on the side of a turning center) to correct under-steer such that a deviation of the actual yaw rate from the target yaw rate is minimized and if in over-steer condition braking force is applied to outer wheels (wheels on the opposite side of a turning center) to correct over-steer.

In this technique, however, since the braking force control is executed so as to bring an actual yaw rate closer to a target yaw rate, if the target yaw rate is established erroneously, then the braking force is also determined erroneously and this erroneous braking force may lead the vehicle to spin or drift-out. For example, on a slippery road, when a vehicle driver turns the steering wheel fully to the lock in order to avoid an obstacle, a target yaw rate produced accordingly is so large that the vehicle itself can not retain a stable running condition. If the braking force control is continued to be applied in this situation, eventually the vehicle will enter into a spin tendency.

SUMMARY OF THE INVENTION

Accordingly, the present invention is intended to obviate the disadvantages of the known braking force control system and it is an object of the present invention to provide a braking force control system capable of controlling the vehicle with stability by means of preventing the target yaw rate from being established to a larger value than necessary in case where a vehicle driver is forced to turn a steering wheel excessively.

A braking force control system according to the present invention comprises:

vehicle speed detecting means for detecting a vehicle speed;

steering angle detecting means for detecting a steering angle;

actual yaw rate detecting means for detecting an actual yaw rate;

lateral acceleration detecting means for detecting a lateral acceleration;

yaw rate gain calculating means for calculating a yaw rate gain based on the vehicle speed;

target yaw rate calculating means for calculating a target yaw rate based on the vehicle speed, the steering angle and the yaw rate gain;

target yaw rate restricting means for restricting an absolute value of the target yaw rate to a value below an upper limit value based on the lateral acceleration and the vehicle speed and for outputting the value as a restricted target yaw rate;

yaw rate deviation calculating means for calculating a yaw rate deviation of the actual yaw rate and the restricted target yaw rate;

target braking force calculating means for calculating a target braking force based on the yaw rate deviation, the steering angle, the yaw rate gain, the vehicle speed and the actual yaw rate;

braking wheel determining means for determining a braking wheel based on the actual yaw rate and the yaw rate deviation such that a rear wheel on the side of a turning center is selected when the actual yaw rate differs from the yaw rate deviation in sign and such that a front wheel on the opposite side of a turning center is selected when the actual yaw rate agrees with the yaw rate deviation in sign;

output judging means for selectively determining a judging threshold value based on the yaw rate deviation, the actual yaw rate and the vehicle speed, for outputting a control signal so as to executing a braking force control when an absolute value of the yaw rate deviation is larger than the threshold value and for outputting a noncontrol signal so as to stop a braking force control when the absolute value of the yaw rate deviation is smaller than the threshold value; and brake signal outputting means responsive to the control signal for outputting a brake signal to the brake drive apparatus so as to apply the target braking force to the braking wheel and responsive to the noncontrol signal for stopping the brake signal to the brake drive apparatus.

BRIEF DESCRIPTION OF THE DRAWINGS

FIGS. 7(e)–7(f) together are example of a time chart of a braking force control according to a first embodiment of the present invention;

DETAILED DESCRIPTION OF THE PREFERRED EMBODIMENTS

Figure 2:
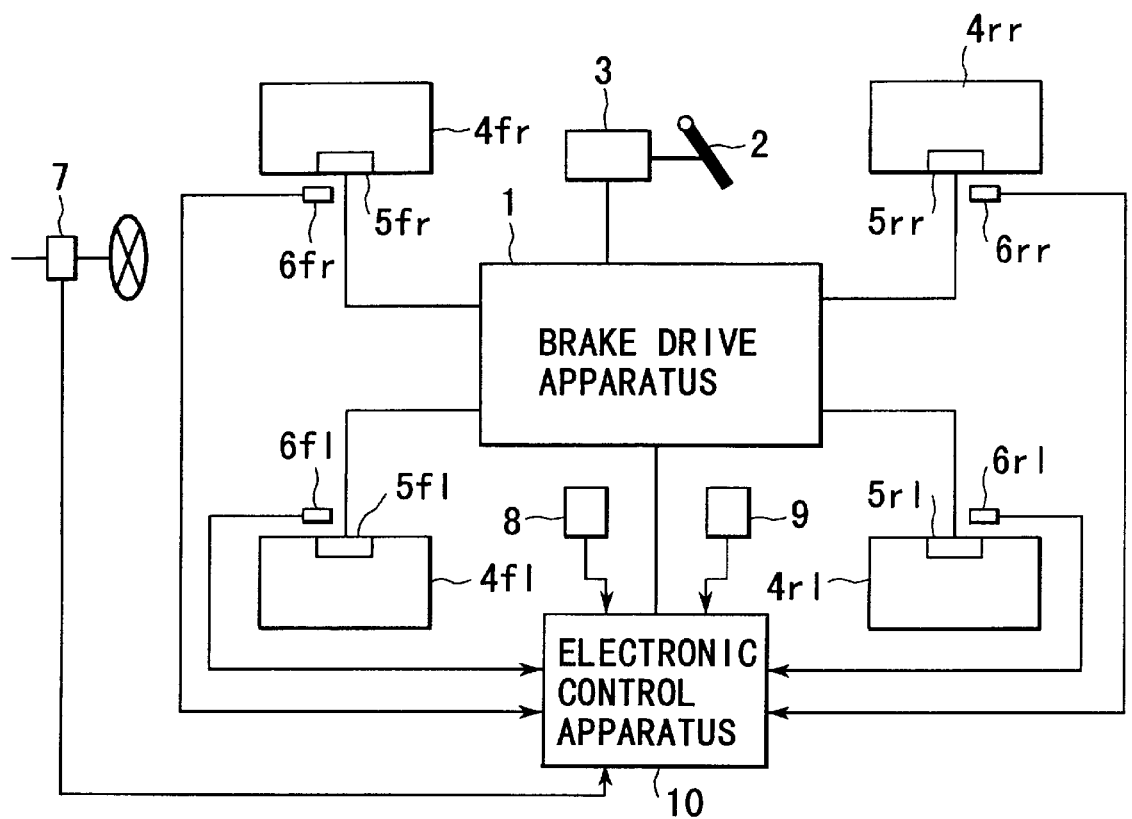
FIG. 2 is a schematic diagram showing a first embodiment according to the present invention.

Referring now to FIG. 2, numeral 1 denotes a brake drive apparatus to which a brake pedal 2 operated by a vehicle driver and a master cylinder 3 are connected. When the vehicle driver depresses the brake pedal 2, brake pressure is supplied from the master cylinder 3 to each of wheel cylinders, $5_{fl}$ for a left front wheel, $5_{fr}$ for a right front wheel, $5_{rl}$ for a left rear wheel and $5_{rr}$ for a right rear wheel through the brake drive section 1 to apply brakes to four wheels, a left front wheel $4_{fl}$, a right front wheel $4_{fr}$, a left rear wheel $4_{rl}$ and a right rear wheel $r_{rr}$.

The brake drive apparatus 1 is a hydraulic unit comprising a pressure source, pressure reducing values, pressure increasing values and the like for feeding brake pressure independently to each wheel cylinder, $5_{fl}$, $5_{fr}$, $5_{rl}$ and $5_{rr}$, according to input signals.

The wheel speeds of four wheels are detected independently for each of four wheels $4_{fl}$, $4_{fr}$, $4_{rl}$, $4_{rr}$ by wheel speed sensors, $6_{fl}$ for the left front wheel, $6_{fr}$ for the right front wheel, $6_{rl}$ for the left rear wheel and $6_{rr}$ for the right rear wheel. Further, a steering wheel angle sensor 7 is disposed at the steering wheel section to detect the rotational angle of the steering wheel.

Numeral 10 denotes an electronic control apparatus composed of a micro-computer and its peripheral circuits, to which the wheel speed sensors $6_{fl}$, $6_{fr}$, $6_{rl}$ and $6_{rr}$, the steering wheel angle sensor 7, a yaw rate sensor 8 for detecting an actual yaw rate and a lateral acceleration sensor 9 are connected and from which a drive signal is outputted to the brake drive apparatus 1.

Figure 1:
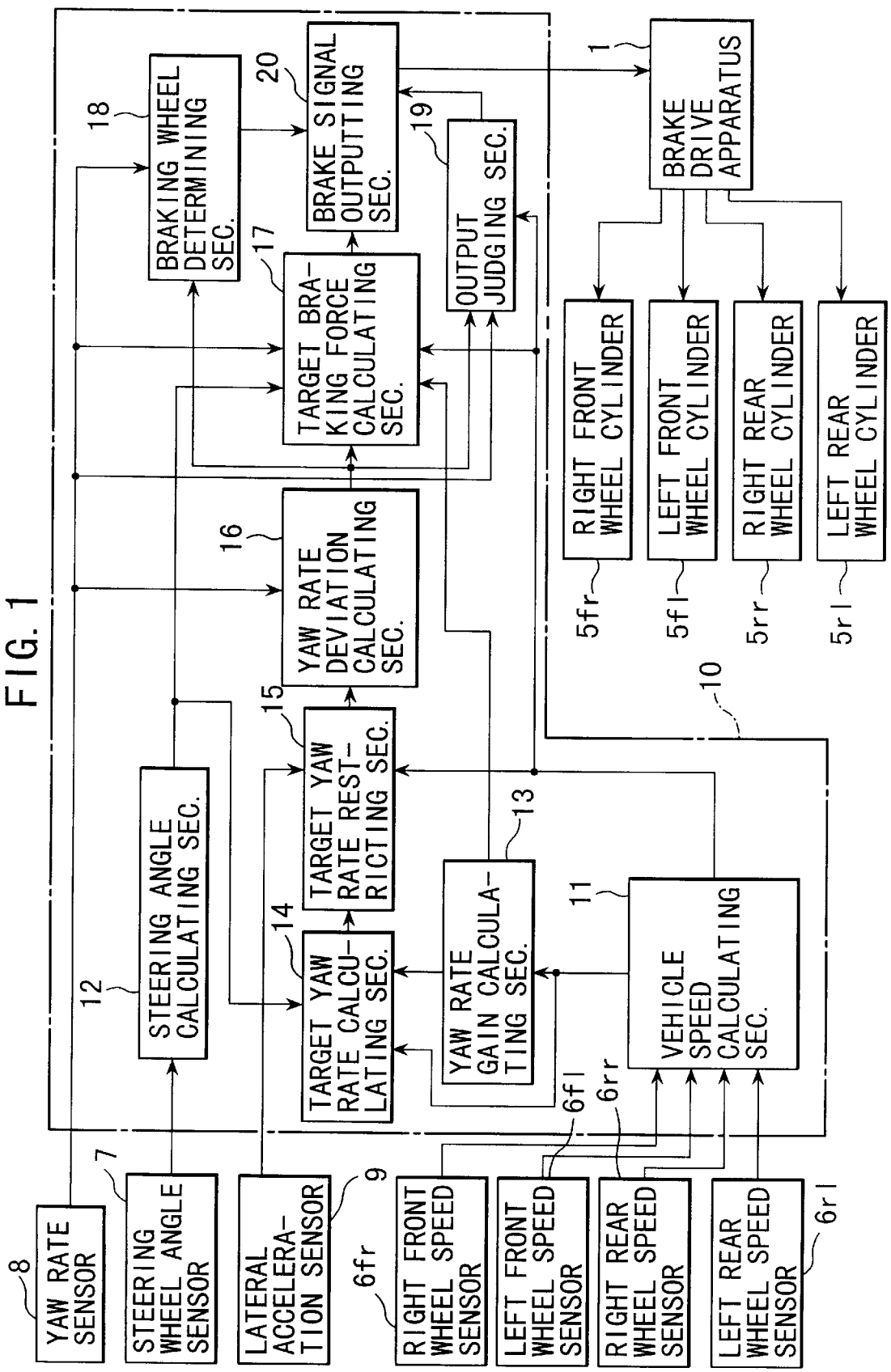
FIG. 1 is a functional block diagram showing a first embodiment according to the present invention.

As shown in FIG. 1, the electronic control apparatus 10 comprises a vehicle speed calculating section 11, a steering angle calculating section 12, a yaw rate gain calculating section 13, a target yaw rate calculating section 14, a target yaw rate restricting section 15, a yaw rate deviation calculating section 16, a target braking force calculating section 17, a braking wheel determining section 18, an output judging section 19 and a brake signal outputting section 20.

The vehicle speed calculating section 11 obtains a vehicle speed V by calculating based on wheel speeds $\omega_1$, $\omega_2$, $\omega_3$, $\omega_4$ derived from the wheel speed sensors $6_{fl}$, $6_{fr}$, $6_{rl}$, $6_{rr}$ respectively according to a predetermined formula (for example averaging speed signals from the wheel speed sensors $6_{fl}$, $6_{fr}$, $6_{rl}$ and $6_{rr}$) and outputs the calculated vehicle speed V to the yaw rate gain calculating section 13, the target yaw rate restricting section 15 and the target braking force calculating section 17.

Further, the steering angle calculating section 12 calculates an actual steering angle $\delta f$ ($=\theta/N$) by dividing a steering angle $\theta$ derived from the steering angle sensor 7 by a steering gear ratio N and outputs the actual steering angle $\delta f$ to the target yaw rate calculating section 14 and the target braking force calculating section 17.

Further, the yaw rate gain calculating section 13 calculates a yaw rate value (a yaw rate gain $G_{\tau\delta f}(0)$) with respect to the actual steering angle $\delta f$ when the vehicle turns around a fixed circle and outputs the calculated target yaw rate gain $G_{\tau\delta f}(0)$ to the target yaw rate calculating section 14 and the target braking force calculating section 17. The yaw rate gain Gτδf is calculated according to the following formula:

$$G_{\tau\delta f}(0) = [1/(1+A_0 \cdot V^2)] \cdot V/L \quad (1)$$

where L is a wheelbase of the vehicle; $A_0$ is a stability factor determined by vehicle specifications. Further, the stability factor $A_0$ is obtained according to the following formula:

$$A_0 = [-m \cdot (L_f \cdot CP_f - L_r \cdot CP_r)]/(2 \cdot L^2 \cdot CP_f \cdot CP_r) \quad (2)$$

where m is a vehicle weight; $L_f$ is a distance between a front axle and a center of gravity; $L_r$ is a distance between a rear axle and a center of gravity; $CP_f$ is an equivalent cornering power for the front tire; $CP_r$ is an equivalent cornering power for the rear tire.

The target yaw rate calculating section 14 calculates a target yaw rate $\tau'$ taking a delay of response into consideration based on the actual steering angle $\delta f$ derived from the steering angle calculating section 12 and the yaw rate gain $G_{\tau\delta f}(0)$ derived from the yaw rate gain calculating section 13 and outputs the calculated target yaw rate $\tau'$ to the target yaw rate restricting section 15. The target yaw rate $\tau'$ is calculated according to the following formula:

$$\tau' = [1/(1+T \cdot s)] \cdot G_{\tau\delta f}(0) \cdot \delta f \quad (3)$$

where T is a time constant; s is a Laplacean. The formula (3) is a formula in which the response delay of the vehicle expressed in the second order is approximated to the one in the first order. The time constant T is obtained from the following formula:

$$T = m \cdot L_f \cdot V/(2 \cdot L \cdot CP_r) \quad (4)$$

The target yaw rate restricting section 15 outputs an absolute value of the target yaw rate $\tau'$ restricted to a value lower than a specified upper limit value $\tau'_{max}$ to the yaw rate deviation calculating section 16. This upper limit value $\tau'_{max}$ is obtained by dividing an absolute value of a lateral acceleration |YG| by the vehicle speed V. That is, $\tau'_{max}$ is expressed in the following formula:

$$\tau'_{max} = |YG|/V \quad (5)$$

This formula is determined from the following equations:

$$YG = V_2/R \quad (6)$$

$$\tau'_{max} = V/R \quad (7)$$

where R is a turning radius.

Thus, since the absolute value of the target yaw rate $\tau'$ calculated in the target yaw rate calculating section 14 is restricted in the target yaw rate restricting section 15, the target yaw rate is prevented from being established to a larger value than needed and the vehicle can be controlled with a proper braking force applied, even in a situation where the vehicle driver is forced to turn a steering wheel excessively on a slippery road.

Further, the upper limit value $\tau'_{max}$ has a lower limit $C_{YG}$ (for example 3 m/sec$^2$) established in the absolute value $|YG|$ of the lateral acceleration (the lower limit value of the upper limit value $\tau'_{max}$ is $C_{YG}/V$) so as to prevent the upper limit value $\tau'_{max}$ from being established at 0 when the detected lateral acceleration is small, for example, 0.

The yaw rate deviation calculating section 16 obtains a yaw rate deviation $\Delta\tau(=\tau-\tau')$ by subtracting the target yaw rate $\tau'$ outputted from the yaw rate restricting section 15 from the actual yaw rate $\tau$ detected in the yaw rate sensor 8 and outputs this yaw rate deviation $\Delta\tau$ to the target braking force calculating section 17, the braking wheel determining section 18 and the output judging section 19.

The target braking force calculating section 17 calculates a target braking force (a front wheel target brake pressure BF2$_f$ and a rear wheel target brake pressure BF2$_r$) based on the vehicle operating conditions and the yaw rate deviation and outputs the calculated target brake pressures BF2$_f$, BF2$_r$ to the brake signal outputting section 20. The target brake pressures BF2$_f$ and BF2$_r$ are calculated according to the following formula.

$$BF2_f = G_1 \cdot (\Delta A \cdot 4 \cdot L^2 \cdot CP_f CP_r \cdot V) / [(CP_f + CP_r)/d_f] \cdot \gamma \qquad (8)$$

$$BF2_r = G_1 \cdot (\Delta A \cdot 4 \cdot L^2 \cdot CP_f CP_r \cdot V) / [(CP_f + CP_r)/d_r] \cdot \gamma \qquad (9)$$

where $G_1$ is a gain; $d_f$ is a front tread; and $d_r$ is a rear tread. $\Delta A$ is expressed in the following formula:

$$\Delta A = [\delta f / (G_{\gamma\delta f}(0) \cdot \delta f + \Delta\gamma) - 1/G_{\gamma\delta f}(0)] / L \cdot V \qquad (10)$$

The yaw rate deviation $\Delta\gamma$ in the formula (10) may be corrected by a side slip angle $\beta$ (angle contained by a running direction of the vehicle and a lengthwise direction of the vehicle). Further, in order to prevent the rear wheel from slipping due to braking force applied thereto particularly on a road with a surface having low friction coefficient or to prevent the vehicle driver from having an unstable feeling about a strong head turn moment when braking force is applied to the rear wheel, the rear wheel target brake pressure BF2$_r$ may be made smaller than the value obtained in the formula (9) by multiplying a small gain which is larger than 0 and smaller than 1.

The braking wheel determining section 18 selects a braking wheel (a wheel to which a brake is applied) according to the combination of the sign of the actual yaw rate $\gamma$ and the sign of the yaw rate deviation $\Delta\gamma$.

Figure 3:
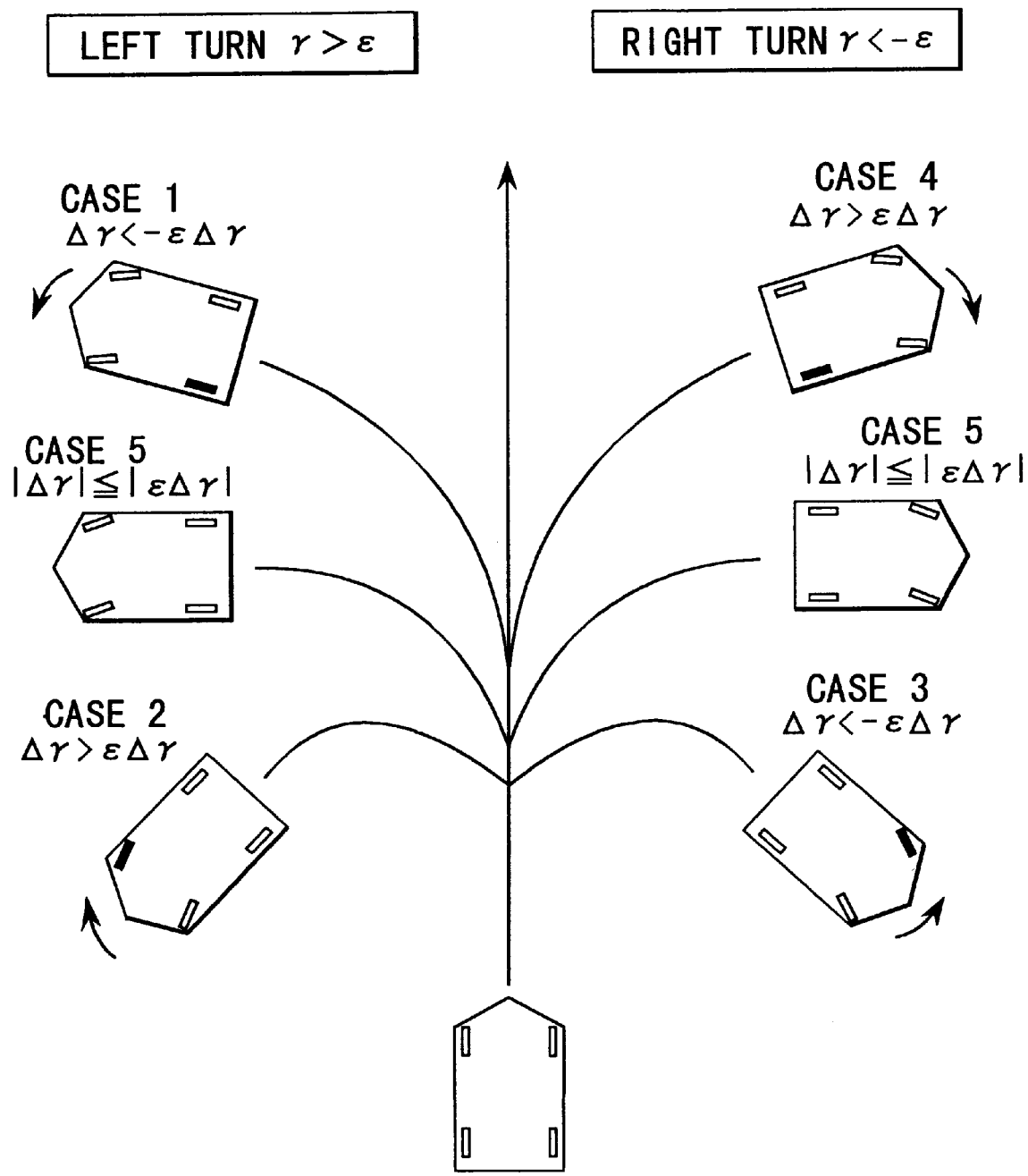
FIG. 3 is an explanatory view showing vehicle behaviors according to a braking force control of a first embodiment.

As to whether the actual and target yaw rates, $\gamma$, $\gamma'$ are plus or minus, a plus sign is given when the vehicle turns to the left and a minus sign is given when the vehicle turns to the right. As shown in FIG. 3, the braking wheel is selected as follows:

Case 1. A brake is applied to the left rear wheel, when $\gamma > \epsilon$ and $\Delta\gamma < \epsilon\Delta\gamma$, i.e., the vehicle is turning to the left and is in an under-steer tendency with respect to the target yaw rate $\gamma'$;

Case 2. A brake is applied to the right front wheel, when $\gamma > \epsilon$ and $\Delta\gamma > \epsilon\Delta\downarrow$, i.e., the vehicle is turning to the left and is in an over-steer tendency with respect to the target yaw rate $\gamma'$;

Case 3. A brake is applied to the left front wheel, when $\gamma < \epsilon$ and $\Delta\gamma < -\epsilon\Delta\gamma$, i.e., the vehicle is turning to the right and is in an over-steer tendency with respect to the target yaw rate $\gamma'$;

Case 4. A brake is applied to the right rear wheel, when $\gamma < \epsilon$ and $\Delta\gamma > \epsilon\Delta\gamma$, i.e., the vehicle is turning to the right and is in an under-steer tendency with respect to the target yaw rate $\gamma'$; and Case 5. No brake is applied to any wheel, when $|\gamma| < |\epsilon|$, i.e., the vehicle is almost in a straight running condition, or $|\Delta\gamma| \leq |\epsilon\Delta\gamma|$, i.e., the vehicle is in an almost neutral-steer condition; where $\epsilon$ and $\epsilon\Delta\gamma$ are positive values which are nearly equal to zero and these are predetermined through experiments or calculations.

Except for Case 5 where it is judged that the vehicle travels in straight, or that the vehicle is in a neutral-steer condition, when the sign of the actual yaw rate $\gamma$ is different from that of the yaw rate deviation $\Delta\gamma$, the inner rear wheel is selected as a braking wheel and when the sign of the actual yaw rate $\gamma$ is the same as that of the yaw rate deviation $\Delta\gamma$, the outer front wheel is selected as a braking wheel. A signal of the selected wheel is outputted from the braking wheel determining section 18 to the brake signal outputting section 20.

The output judging section 19 determines a judging threshold value $\epsilon\Delta$ which will be described hereinafter and judges whether or not the yaw rate deviation $\Delta\gamma$ is in the control area by comparing the yaw rate deviation $\Delta\gamma$ with the judging threshold value $\epsilon\Delta$ and outputs the result of the judgment to the brake signal outputting section 20.

In the judging threshold value $\epsilon\Delta$, a first threshold value $\epsilon\Delta M$ is set when the vehicle is in a normal behavior. Until a specified time elapses since the behavior tendency of the vehicle is shifted from under-steer to over-steer, or until either the yaw rate deviation or the actual yaw rate becomes zero after the vehicle is shifted to an over-steer tendency, a second threshold value $\epsilon\Delta S$ is set as the judging threshold value $\epsilon\Delta$. This first threshold value $\epsilon\Delta M$ and this second threshold value $\epsilon\Delta S$ are both positive numbers which have been obtained from experiments, calculations or the like beforehand. Further, the relationship between these threshold values is $|\epsilon\Delta M| > |\epsilon\Delta S| > |\epsilon\Delta\gamma|$.

Figure 8A:
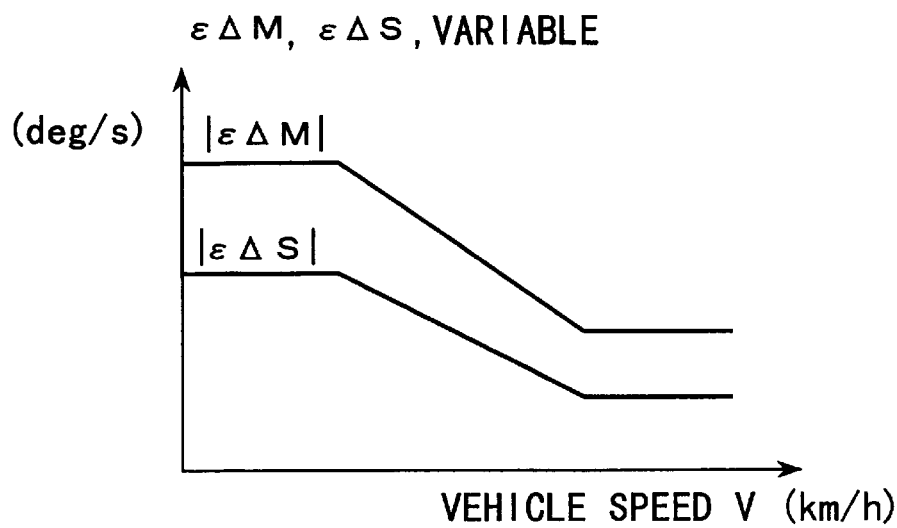
FIGS. 8a, 8b and 8c are graphical maps comprising explanatory views showing a characteristic of a judging threshold value according to a first embodiment of the present invention.
Figure 8B:
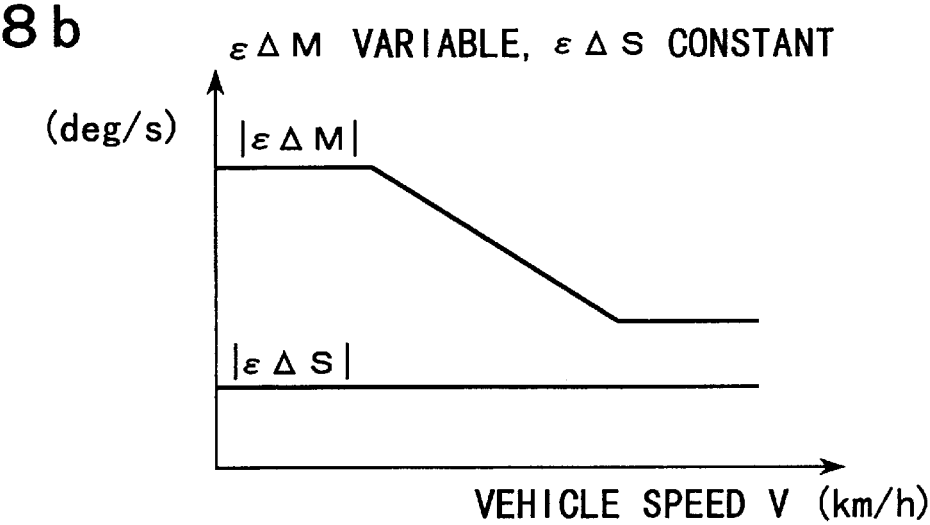
Figure 8C:
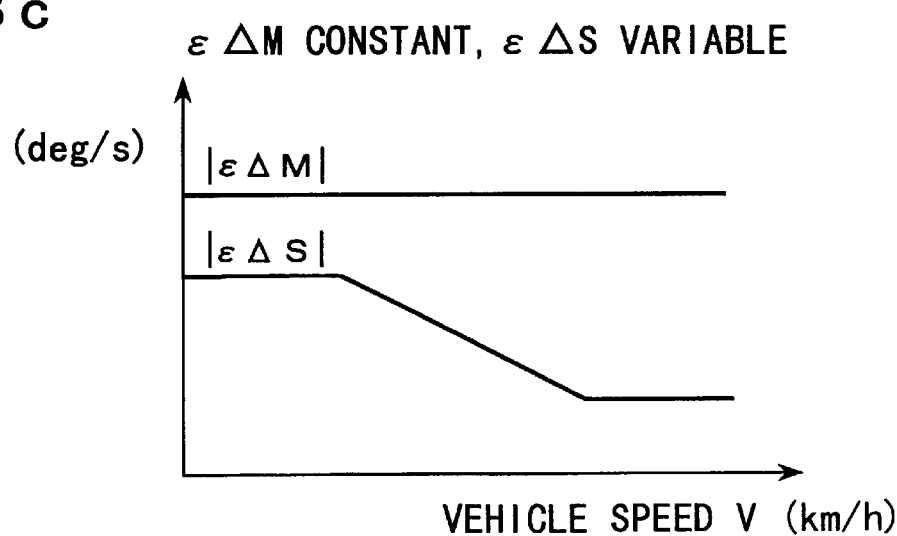

The first threshold value $\epsilon\Delta M$ and the second threshold value $\epsilon\Delta S$ are stored on maps as shown in FIG. 8a to FIG. 8c. When the vehicle behavior becomes unstable at low speed, a vehicle driver can more easily correct the vehicle posture than at high speed and hence a noncontrol zone, i.e., a zone where the control is not needed, can be established with a broader range. In an example of the threshold values shown in FIG. 8a, both the first and second threshold values, $\epsilon\Delta M$ and $\epsilon\Delta S$ are established in such a way that these values are decreased with an increase of vehicle speed. In an example shown in FIG. 8b, only the first threshold value $\epsilon\Delta M$ becomes small with an increase of vehicle speed while the second threshold value $\epsilon\Delta S$ is held constant. Further, in an example shown in FIG. 8c, while the first threshold value $\epsilon\Delta M$ is held constant, the second threshold value $\epsilon\Delta S$ becomes small with an increase of vehicle speed.

When the output judging section 19 outputs a judging signal indicating that the yaw rate deviation is in the control zone, the brake signal outputting section 20 sends an output signal t1 to the brake drive apparatus 1 such that either of the target brake pressures BF2$_f$ or BF2$_r$ which have been calculated in the target brake pressure calculating section 17 is applied to the wheel selected in the braking wheel determining section 18.

Figure 4:
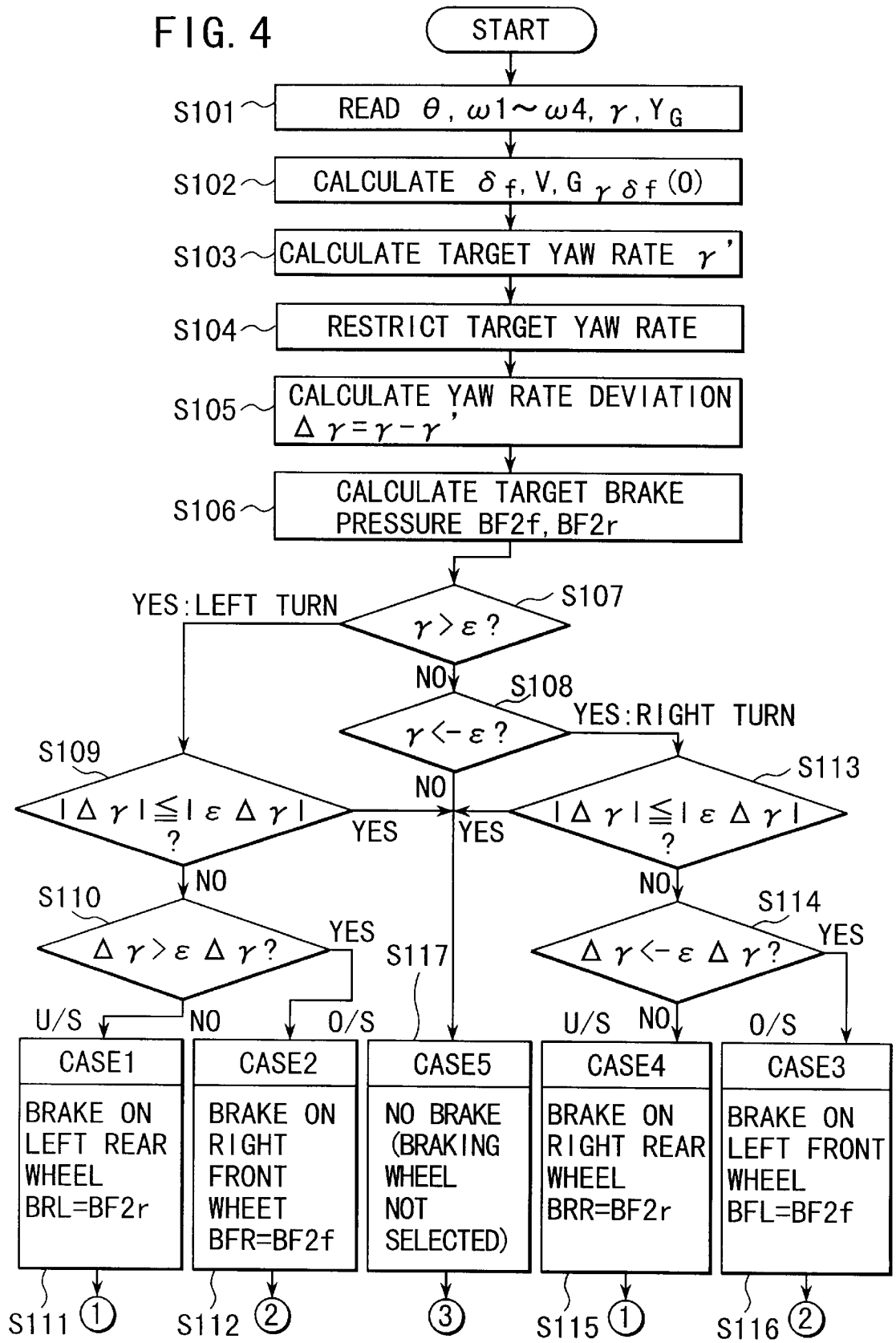
FIG. 4 is a flowchart showing a braking force control according to a first embodiment of the present invention.
Figure 5:
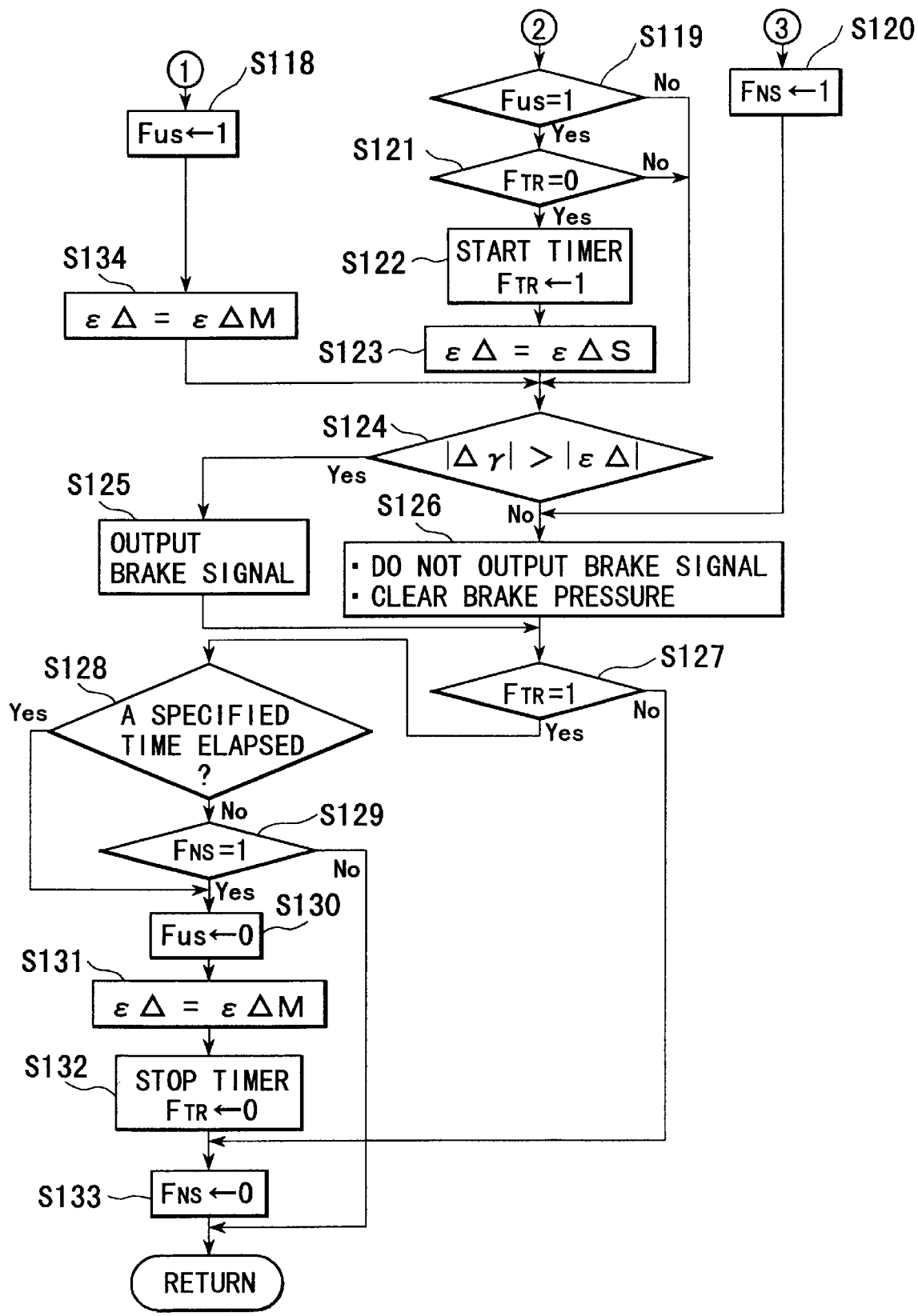
FIG. 5 is a flowchart continued from the flowchart shown in FIG. 4.

Next, an operation of the braking force control according to a first embodiment of the present invention will be described with reference to flowcharts shown in FIG. 4 and FIG. 5. The control program for the braking force control system is executed at a specified time interval (for example 10 milli-second) during running of the vehicle. When the program starts, at a step S101 a steering wheel angle $\theta$ is read from the steering wheel angle sensor 7, wheel speeds $\omega_1, \Omega_2, \omega_3, \omega_4$ are read from the wheel speed sensors 6$_{fl}$, 6$_{fr}$, $6_{rl}$, $6_{rr}$ respectively, an actual yaw rate $\gamma$ is read from the yaw rate sensor 8, a lateral acceleration YG is rad from the lateral acceleration sensor 9 and the program goes to S102.

At S102 an actual steering angle $\delta_f$ is calculated from the steering wheel angle $\theta$ ($\delta f=\theta/N$) in the steering angle calculating section 12 and a vehicle speed V is calculated from the wheel speeds $\omega_1$, $\Omega_2$, $\Omega_3$, $\Omega_4$ in the vehicle speed detecting section 11. Further, a yaw rate gain $G_{\gamma\delta f}$ (0) is calculated according to the formula (1) in the yaw rate gain calculating section 13.

Then, the program goes to S103 in which a target yaw rate $\gamma'$ is calculated according to the formula (3) in the target yaw rate calculating section 14. After that, at S104 an absolute value of the target yaw rate $\gamma'$ calculated in the target yaw rate calculating section 14 is restricted to a value below the established upper limit value $\gamma'_{max}$.

Then, the program goes to S105 where a yaw rate deviation $\Delta\gamma$ (=$\gamma-\gamma'$) is calculated in the yaw rate deviation calculating section 16 and at S106 a front wheel target brake pressure $BF2_f$ and a rear wheel target brake pressure $BF2_r$ is calculated in the target braking force calculating section 17 according to the formulas (8) and (9), respectively.

The steps S107 to S117 are steps performed in the braking wheel determining section 18. First, at S107 it is judged whether or not the actual yaw rate $\gamma$ is larger than $\epsilon$, that is to say, whether or not the vehicle is making a relatively sharp left turn and if the actual yaw rate $\gamma$ is less than $\epsilon$ the program goes to S108 where it is judged whether or not the actual yaw rate $\gamma$ is smaller than $-\epsilon$., that is to say, whether or not the vehicle is making a relatively sharp right turn. If at S108 it is judged to be $\epsilon \geq \gamma \geq -\epsilon$, since it can be judged that the vehicle is making neither a left turn nor a right turn, namely since it can be judged that the vehicle is running roughly in straight, no braking wheel is selected (no brake is applied to any wheel). If at S107 it is judged that $\gamma$ is larger than $\epsilon$ ($\gamma>\epsilon$), the program goes to S109 where it is judged whether or not the yaw rate deviation $\Delta\gamma$ is near zero according to the formula of inequality $|\Delta\gamma|\leq|\epsilon\Delta\downarrow|$, namely, it is judged whether or not the vehicle is roughly in a neutral-steer.

Further, at S109 if $|\Delta\gamma|\leq|\epsilon\Delta\downarrow|$, namely, it is judged that the actual yaw rate $\gamma$ is roughly equal to the target yaw rate $\gamma'$, the program steps to S117 and if otherwise (in an under-steer tendency or in an over-steer-tendency), the program goes to S110. The step S110 is a step where it is judged whether or not the vehicle is either in an under-steer tendency or in an over-steer tendency. At S110 if $\Delta\gamma<-\epsilon\Delta\gamma$ and the sign f the yaw rate deviation $\Delta\gamma$ is negative differently from the sign of the actual yaw rate $\gamma$, it is judged that the vehicle is in an under-steer tendency with respect to the target yaw rate $\gamma'$ and the program steps to S111 where a left rear wheel $4_{rl}$ is selected as braking wheel.

Further, at S110 if $\Delta\gamma>\epsilon\Delta\gamma$ and the sign of the yaw rate deviation $\Delta\gamma$ is positive similarly to the sign of the actual yaw rate $\gamma$, it is judged that the vehicle is in an over-steer tendency with respect to the target yaw rate $\gamma'$ and the program steps to S112 where a right front wheel $4_{fr}$ is selected as a braking wheel.

On the other hand, at S108 if it is judged that the yaw rate $\gamma$ is less than $-\epsilon$ ($\gamma<-\epsilon$), that is, if it is judged that the vehicle is making a relatively sharp right turn, the program steps to S113 where it is judged whether or not the yaw rate deviation $\Delta\gamma$ is near zero according to the formula of inequality $|\Delta\gamma|\leq|\epsilon\Delta\downarrow|$, namely, it is judged whether or no the vehicle is roughly in a neutral-steer.

At S113, if $|\Delta\gamma|\leq|\epsilon\Delta\gamma|$ and it is judged that the vehicle is roughly in a neutral-steer, the program goes to S117 and if otherwise (either in an under-steer tendency or in an over-steer tendency), the program goes to S114.

The step S114 is a step where it is judged whether the vehicle is in an under steer tendency or in an over-steer tendency according to $\Delta\gamma>\epsilon\Delta\gamma$ or $\Delta\gamma<-\epsilon\Delta\gamma$. If $\Delta\gamma>\epsilon\Delta\gamma$ and the sign of the yaw rate deviation $\Delta\gamma$ is positive differently from the sign of the actual yaw rate $\gamma$, it is judged that the vehicle is in an under-steer tendency with respect to the target yaw rate $\gamma'$ and then the program goes to S115. On the other hand, it $\Delta\gamma<-\epsilon\Delta\gamma$ and the sign of the yaw rate deviation $\Delta\gamma$ is negative similarly to the sign of the actual yaw rate $\gamma$, it is judged that the vehicle is in an over-steer tendency with respect to the target yaw rate $\gamma'$ and then the program goes to S116.

When the program goes to S115, a right rear wheel $4_{rr}$ is selected as a braking wheel. Further, when the program goes to S116, a left front wheel $4_{fl}$ is selected as a braking wheel.

Further, when the program goes from S108, S109 or S113 to S117, no braking wheel is selected and consequently no brake is applied.

Further, in case where a braking wheel is selected with an under-steer tendency at S111 or S115, the program goes to S118 and in case where a braking wheel is selected with an over-steer tendency at S112 or S116, the program goes to S119. Further, in case where no braking wheel is selected at S117, the program goes to S120.

When the program goes to S118, an under-steer flag $F_{US}$ is set to 1 ($F_{US}\leftarrow 1$) and then the program steps to S134 where the judging threshold value $\epsilon\Delta$ is set to a first threshold value $\epsilon\Delta M$. The under-steer flag $F_{US}$ is a flag for indicating that the vehicle has been driven in an under-steer tendency. It is cleared ($F_{US}\leftarrow 0$), when a specified time has elapsed since the vehicle is shifted to an over-steer tendency or when the vehicle is shifted from an over-steer tendency to a neutral-steer tendency.

Further, when the program goes to S119, it is judged whether or not the under-steer flag $F_{US}$ has been set to 1 ($F_{US}=1$). If it is judged that the flag has been set to 1, namely, if it is judged that the vehicle has been driven in an under-steer tendency, the program steps to S121 and if it is cleared, the program skips to S124. In general, when the friction coefficient of a road surface is low, the vehicle enters into an under-steer tendency. When the braking force control changes the vehicle behavior from an under-steer to over-steer tendency, since the under-steer flag $F_{US}$ has been set, the program steps from S119 to S121. However, in case where the vehicle is shifted to an over-steer tendency without passing through an under-steer tendency for some reason or other, the program skips to S124 without processing steps S121 to S123.

When the program goes to S121 after judging $F_{US}=1$ at S119, it is judged whether or not a timer start flag $F_{TR}$ has been cleared ($F_{TR}=0$). The timer start flag $F_{TR}$ is a flag which is set ($F_{TR}\leftarrow 1$) when the threshold value determining timer starts and is cleared ($F_{TR}=0$) when it stops.

If it is judged at S121 that the timer start flag $F_{TR}$ has been cleared ($F_{TR}=0$) and the threshold value determining timer has stopped, the program steps to S122 where the threshold value determining timer is started and at the same time the timer start flag $F_{TR}$ is set and then goes to S123. At S123, a second threshold value $\epsilon\Delta S$ is set to the judging threshold value $\epsilon\Delta$. On the other hand,, if it is judged at S121 that the timer start flag $F_{TR}$ has been set ($F_{TR}=1$) and the timer is operated, the program skips to S124.

When the program goes to S124 from either of S134, S119, S121, S123, the yaw rate deviation $\Delta\gamma$ is compared with the judging threshold value $\epsilon\Delta$ (comparison in absolute value). If $|\Delta\gamma|>|\epsilon\Delta|$ at S124, the program goes to S125 where a brake signal is outputted from the brake signal outputting section 20 to the brake drive apparatus 1. That is to say, if it is judged at S124 that the yaw rate deviation $\Delta\gamma$ is in the control zone, the brake drive apparatus 1 generates a corresponding brake pressure to a corresponding braking wheel for braking. More specifically, in case where the program comes from S111 through S118, the brake pressure $BF2_4$ is sent to the wheel cylinder $5_{rl}$, in case where the program am comes from S115 through S118, the brake pressure $BF2_4$ is sent to the wheel cylinder $5_{rr}$, in case where the program comes from S112 through 119, the brake pressure $BF2_f$ is sent to the wheel cylinder $5_{fr}$ and in case where the program comes from S116 through S119, the brake pressure $BF2_f$ is sent to the wheel cylinder $5_{fl}$.

On the other hand, if it is judged at S124 that the yaw rate deviation $\Delta\gamma$ is within the noncontrol zone ($|\Delta\gamma| \leq |\epsilon\Delta|$), the program advances to S126.

Further, when the program goes from S117 to S120, a normal operation flag $F_{NS}$ is set ($F_{NS} \leftarrow 1$) and the program steps to S126. The normal operation flag $F_{NS}$ is a flag for indicating that the vehicle is roughly in the straight running condition or that the actual yaw rate $\gamma$ is approximately equal to the target yaw rate $\gamma'$.

When the program goes from S120 or S124 to S126, no brake signal is outputted and the established brake pressure is cleared. These steps S125 or S126 are executed in the brake signal outputting section 20.

When the program steps from S126 to S127, it is judged whether or not the timer start flag $F_{TR}$ is set (whether or not the threshold value determining timer is operative). If it is judged at S127 that the timer start flag $F_{TR}$ has been cleared, namely, the threshold value determining timer is not operative, the program skips to S133 where the normal operation flag $F_{NS}$ is cleared and than the program goes out of the routine. If the timer start flag $F_{TR}$ has been set, namely, the threshold value determining timer is operative, the program steps to S128 in which it is judged wherther or not a specified time has elapsed.

If it is judged at S128 that a specified time has elapsed, the program skips to S130 where the under-steer flag $F_{US}$ is cleared. Then, at S131 the judging threshold value $\epsilon\Delta$ is set to a first threshold value $\epsilon\Delta$ and at a next step S132 the threshold value determining time is stopped to clear the timer start flag $F_{TR}$ ($F_{TR} \rightarrow 0$). After that, the program steps to S133 where the normal operation flag $F_{NS}$ is cleared and then goes out of the routine.

On the other hand, if it is judged at S128 that a specified time has not elapsed, the program steps to S129 in which it is judged whether or not the normal operation flag $F_{NS}$ is set ($F_{NS}=1$). If the normal operation flag $F_{NS}$ is cleared ($F_{NS}=0$), the program goes out of the routine and if $F_{NS}$ is set, the program steps to S130 where the under-steer flag $F_{US}$ is cleared ($F_{US} \rightarrow 0$). Then, at S131 a first threshold value $\epsilon\Delta M$ is set to the judging threshold value $\epsilon\Delta$ and after that at S132 the threshold value determining timer is stoppped to clear the timer start flag $F_{TR}$ ($F_{TR}0$). Then, the program goes out of the routine after the normal operation flag $F_{NS}$ is cleared ($F_{NS} \rightarrow 0$) at S133.

Further, if it is judged at S128 that a specified time has not elapsed, the program goes to S129 where it is judged whether or not the normal operation flag $F_{NS}$ is set ($F_{NS}=1$). If the normal operation flag $F_{NS}$ is cleared ($F_{NS}=0$), the program goes out of the routine and if it is set ($F_{NS}=1$), the program steps to S130 where the under-steer flag $F_{US}$ is cleared and at the next step S131 the first threshold value $\epsilon\Delta M$ is set to the judging threshold value $\epsilon\Delta$. Then at S132, the threshold value determining timer is stopped to clear the timer start flag $F_{TR}$ and the program goes out of the routine after the normal operation flag $F_{NS}$ is cleared at S133.

That is to say, when the vehicle returns to the normal straight running condition, even before the threshold value determining timer is counted out, the first threshold value $\epsilon\Delta M$ is set to the judging threshold value $\epsilon\Delta$.

Figure 6:
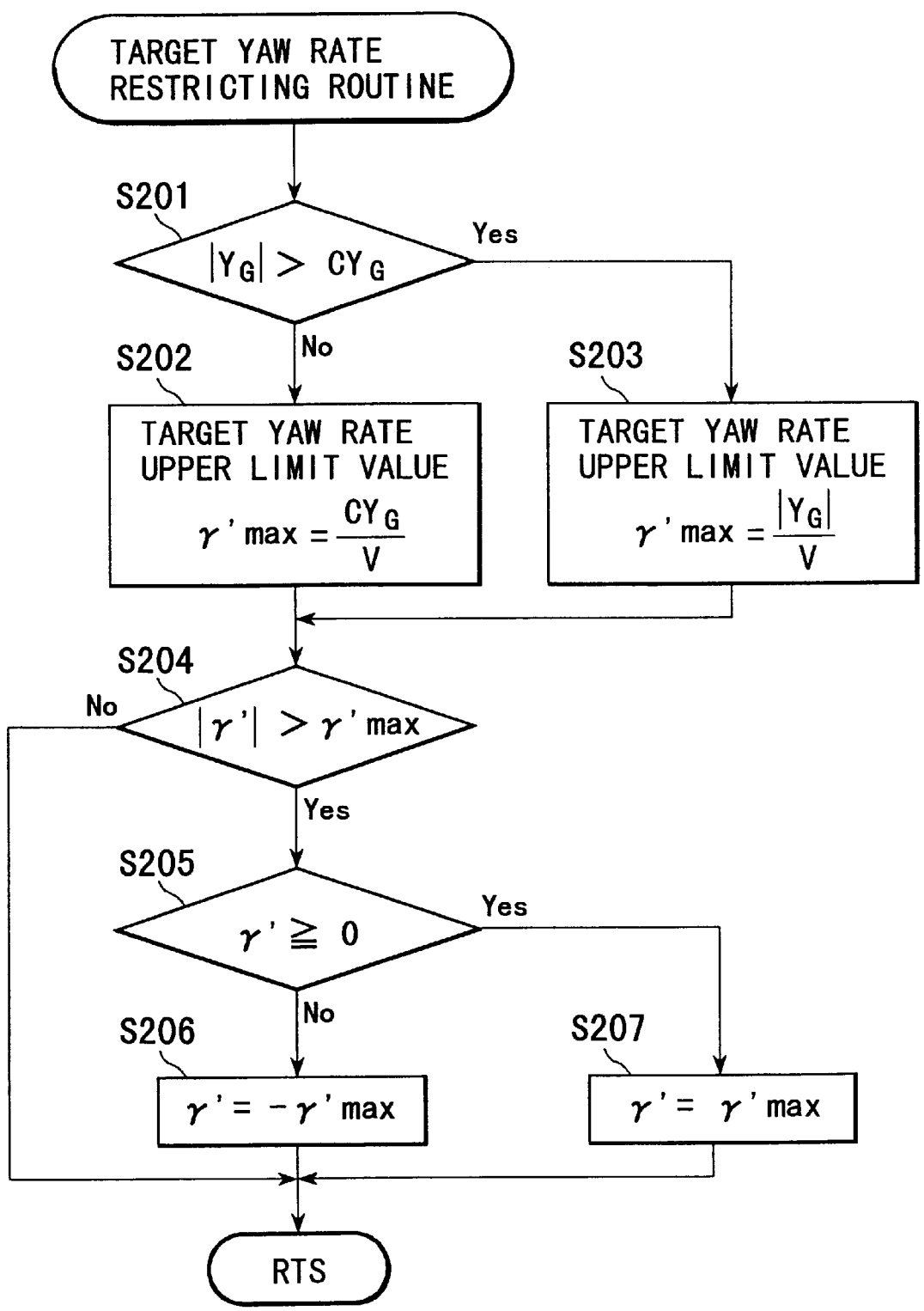
FIG. 6 is a flowchart of a target yaw rate restricting routine according to a first embodiment of the present invention.

Next, the target yaw rate restricting routine which is performed in the target yaw rate restricting section 15 will be described with reference to a flowchart shown in FIG. 6.

First, at S201 an absolute value of the lateral acceleration YG detected by the lateral acceleration sensor 9 is compared with a predetermined lower limit value $C_{YG}$ of lateral acceleration (for example 3 m/s2).

If the absolute value $|YG|$ of the lateral acceleration YG is less than the lower limit value $C_{YG}$ ($|YG| \leq C_{YG}$), the program goes to S202 where the target yaw rate upper limit value $\lambda'max$ is set to $C_{YG}/V$ and if the absolute value is larger than the lower limit value $C_{YG}$ ($|YG|>C_{YG}$), the program goes to S203 where the target yaw rate upper limit value $\lambda'max$ is set to $|YG|/V$. This is a process for preventing the upper limit value $\lambda'_{max}$ from being set to a small value. For example, in case of the lateral acceleration YG=0, the upper limit value $\lambda'_{max}$ never becomes 0.

After the upper limit value $\lambda'_{max}$ is set at S202 or S203, the program goes to S204 where an absolute value of the target yaw rate $\lambda'$ calculated in the target yaw rate calculating section 14 is compared with the upper limit value $\lambda'_{max}$. If the absolute value $|\lambda'|$ of the target yaw rate $\lambda'$ is smaller than the upper limit value $\lambda'_{max}$ ($|\lambda'| \leq \lambda'_{max}$), it is judged that the target yaw rate $\lambda'$ of this moment is located within a range where a stable braking control can be performed and the program goes out of the routine. On the other hand, if the absolute value of the target yaw rate $\lambda'$ is larger than the upper limit value $\lambda'_{max}$ ($|\lambda'|<\lambda'_{max}$), this is a case where the vehicle driver turns a steering wheel largely on a slippery road and the program goes to S205 in which the sign of the target yaw rate $\lambda'$ is checked. If $\lambda'<0$, the program goes to S206 where the target yaw rate $\lambda'$ is set to $-\lambda'_{max}$ and goes out of the routine. If $\lambda' \geq 0$, the program goes to S207 where the target yaw rate $\lambda'$ is set to $\lambda'_{max}$ and goes out of the routine.

Thus, the target yaw rate restricting routine enables to restrict the absolute value $|\lambda'|$ of the target yaw rate $\lambda'$ within $\lambda'_{max}$ capable of a stable braking control, whereby the vehicle driver can enjoys a stable control of the vehicle, even in a case where he or she turns a stearing wheel excessively on a slippery road.

FIG. 7 depicts an example of the braking force control described with reference to flowcharts in FIG. 4 and FIG. 5, in which with respect to a vehicle running in straight at $t_0$ and making a left turn at $t_1$, a change of the target yaw rate $\lambda'$, a change of the actual yaw rate $\lambda$, a change of the yaw rate deviation $\Delta\lambda$, a mode of the normal operation flag $F_{NS}$, a mode of the timer start flag $F_{TR}$, a mode of the under-steer flag $F_{US}$ and an output of the brake signal from the brake signal outputting section 20 are shown respectively. In this example, the absolute value $|\lambda'|$ of the target yaw rate $\lambda'$ is assumed to be less than $\lambda'_{max}$ for simplifying explanation.

The actual yaw rate $\lambda$ increases after $t_1$ with a gradually increasing target yaw rate $\lambda'$. The yaw rate deviation $\Delta\lambda$ of the target yaw rate $\lambda'$ from the actual yaw rate $\lambda$ also increases gradually in a negative direction.

After $t_2$, the absolute value $|\Delta\lambda|$ of the yaw rate deviation $\Delta\lambda$ becomes larger than the threshold value $\epsilon\Delta\lambda$ for judging the state of the actual yaw rate c almost agreeing with the target yaw rate $\lambda'$. At this moment, the vehicle comes into an under-steer tendency, thereby the under-steer flag $F_{US}$ is set. The normal operation flag $F_{NS}$ which has been set before $t_2$ is cleared at $t_2$ and after. Further, the judging threshold value ε∆ for judging the noncontrol area (an area with bias lines in FIG. 6(b)) has been set to the first threshold value ε∆M and therefore no brake signal is outputted until $t_3$ when the absolute value $|\Delta\lambda|$ of the yaw rate deviation ∆λ becomes larger than the judging threshold value ε∆ for judging the noncontrol zone.

Further, after $t_3$ brake signals are allowed to be outputted until $t_4$ when the absolute value $|\Delta\lambda|$ of the yaw rate deviation ∆λ becomes smaller again than the judging threshold value ε∆. In this case, the output mode of brake signal is Case 1 shown in FIG. 3 because of λ∆ε (a positive sign and a left turn) and ∆λ<−ε∆λ (a negative sign and an under-steer tendency). In Case 1, brake is applied to the left rear wheel $4_{rl}$ so as to correct the vehicle behavior by a moment produced in the arrow direction, thereby a drift-out phenomenon is prevented. In this state, even when the left rear wheel $r_{rl}$ is locked and loses a side force due to an excessive braking on the left rear wheel $4_{rl}$, the vehicle still keeps an over-steer tandency and generates a yaw rate having the same direction (an arrow direction) as the nature of the control.

Between $t_4$ and $t_5$, although the vehicle is still in an under-steer tendency, the actual yaw rate λ comes close to the target yaw rate λ' and the absolute value $|\Delta\lambda|$ of the yaw rate deviation ∆λ becomes smaller than the judging threshold value ε∆. In this situation, since the vehicle is located in the noncontrol zone, no brake signal is outputted. Further, between $t_5$ and $t_6$, the absolute value $|\Delta\lambda|$ of the yaw rate deviation ∆λ becomes smaller than the threshold value ε∆λ and the actual yaw rate λ almost agrees with the target yaw rate λ'. The vehicle enters into a neutral-steer condition and the normal operation flag $F_{NS}$ is set.

After that, the absolute value $|\Delta\lambda|$ of the yaw rate deviation ∆λ becomes large in the positive direction. After $t_6$, the vehicle is shifted to an over-steer tendency with respect to the target yaw rate λ' and the normal operation flag $F_{NS}$ is cleared. At the same time, the timer start flag $F_{TR}$ is set to start the threshold value determining timer. Further, the second threshold value ε∆S which is smaller than the first threshold value ε∆M is set as a judging threshold value ε∆.

No brake signal is outputted until $t_7$, since the absolute value $|\Delta\lambda|$ of the yaw rate deviation ∆λ is smaller than the judging threshold value ε∆. After $t_7$, brake signals are allowed to be outputted. In this case, the output mode of brake signal is Case 2 shown in FIG. 3 because of λ>ε (a positive sign and a left turn) and ∆λ>ε∆λ (a positive sign and an over-steer tendency). In Case 2, brake is applied to the right front wheel $4_{fr}$ so as to correct the vehicle behavior by a moment produced in the arrow direction, thereby a spin phenomenon is prevented. In this state, even when the right front wheel $4_{fr}$ is locked and loses a side force due to an excessive braking on the left rear wheel $4_{fr}$, the vehicle still keeps an under-steer tendency and generates a yaw rate having the same direction (an arrow direction) as the nature of the control.

Further, at $t_8$ the absolute value $|\Delta\lambda|$ of the yaw rate deviation ∆λ becomes smaller than the judging threshold value ε∆ and the vehicle enters into the noncontrol zone. After $t_9$, the actual yaw rate λ almost agrees with the target yaw rate λ' before the threshold value determining timer is counted out.

At $t_9$, the normal operation flag $F_{NS}$ is set and at the same time the under-steer flag $F_{US}$ is cleared. The threshold value determining timer is stopped to clear the timer start flag $F_{TR}$. Then, the first threshold value ε∆M is set as a judging threshold value ε∆.

After $t_{10}$, the absolute value $|\Delta\lambda|$ of the yaw rate deviation ∆λ becomes larger than the threshold value ε∆λ and the normal operation flag $F_{NS}$ is cleared. The vehicle is again shifted to an under-steer tendency and the under-steer flag $F_{US}$ is set.

Then, after $t_{11}$, the absolute value $|\Delta\lambda|$ of the yaw rate deviation ∆λ becomes smaller than the threshold value ε∆λ and the actual yaw rate λ almost agrees with the target yaw rate λ'. The normal operation flag $F_{NS}$ is set. The under-steer flag $F_{US}$ remains to be set, however, this does not produce any problem because the vehicle generally experiences an under-steer tendency before it is shifted to an over-steer tendency.

Following $t_8$, since the absolute value $|\Delta\lambda|$ of the yaw rate deviation ∆λ becomes smaller than the judging threshold value ε∆, the vehicle stays in the noncontrol zone and therefore no brake signal is outputted.

In the output judging section 19, since the second threshold value ε∆S which is smaller than the first threshold value ε∆M is employed as a judging threshold value ε∆ during a specified time or until the control under an over-steer tendency is finished, the starting of the control at the converting point from the under-steer tendency to the over-steer tendency can be advanced. In FIG. 7, two-dots chain lines show a yaw rate or a yaw rate deviation according to the prior art. As well understood by these yaw rate or yaw rate deviation, the starting of the control at the converting point from an under-steer tendency to an over-steer tendency is $t_7'$ when the yaw rate deviation ∆λ becomes equal to ε∆M. Hence, the difference between the actual yaw rate λ and the target yaw rate λ' becomes not so large after the vehicle is shifted from an under-steer tendency to an over-steer tendency. Further, according to the present invention, as clearly understood from FIG. 7(a), the actual yaw rate λ can be converged on the target yaw rate λ' earlier than in the prior art. As a result, the vehicle driver can enjoys a smoother, more natural and more docile vehicle behavior control. Further, since the noncontrol zone is established with a larger band width when the braking control by the rear wheel is applied and it is established with a smaller band width when the braking control by the front wheel is applied, the braking control by the rear wheel is restricted. Further, the return of the judging threshold value ε∆ from the second threshold value ε∆S to the ε∆M is performed by the timer and the finishing signal of the control in an over-steer tendency. In this system, since the braking force applied to the rear wheel is restricted, the vehicle can be prevented from a slip when the rear wheel loses a side force due an excessive braking applied there to on a road with a surface having low friction coefficient. Also, the vehicle driver is relieved of an anxiety due to an excessive turning around of the head of the vehicle. Further, since a most appropriate braking wheel is selected from among four wheels by judging the turning direction of the vehicle based on the actual yaw rate λ, by judging the running state based on the yaw rate λ and the yaw rate deviation ∆λ and by judging whether the vehicle is in an under-steer tendency or in an over-steer tendency, the vehicle can be prevented securely from spins or drift-outs during cornering.

Figure 9:
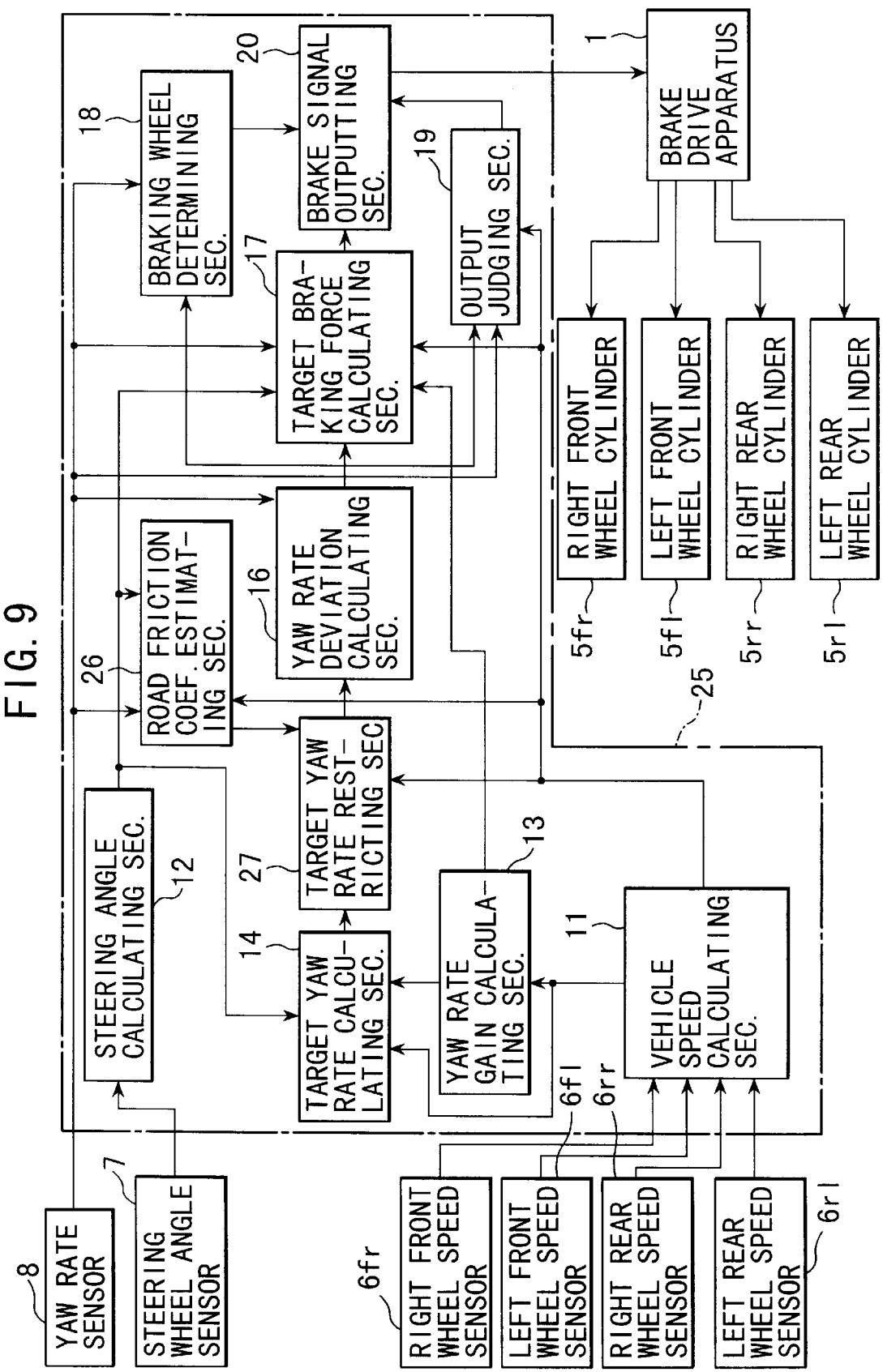
FIG. 9 is a functional diagram showing a braking force control according to a second embodiment of the present invention.
Figure 10:
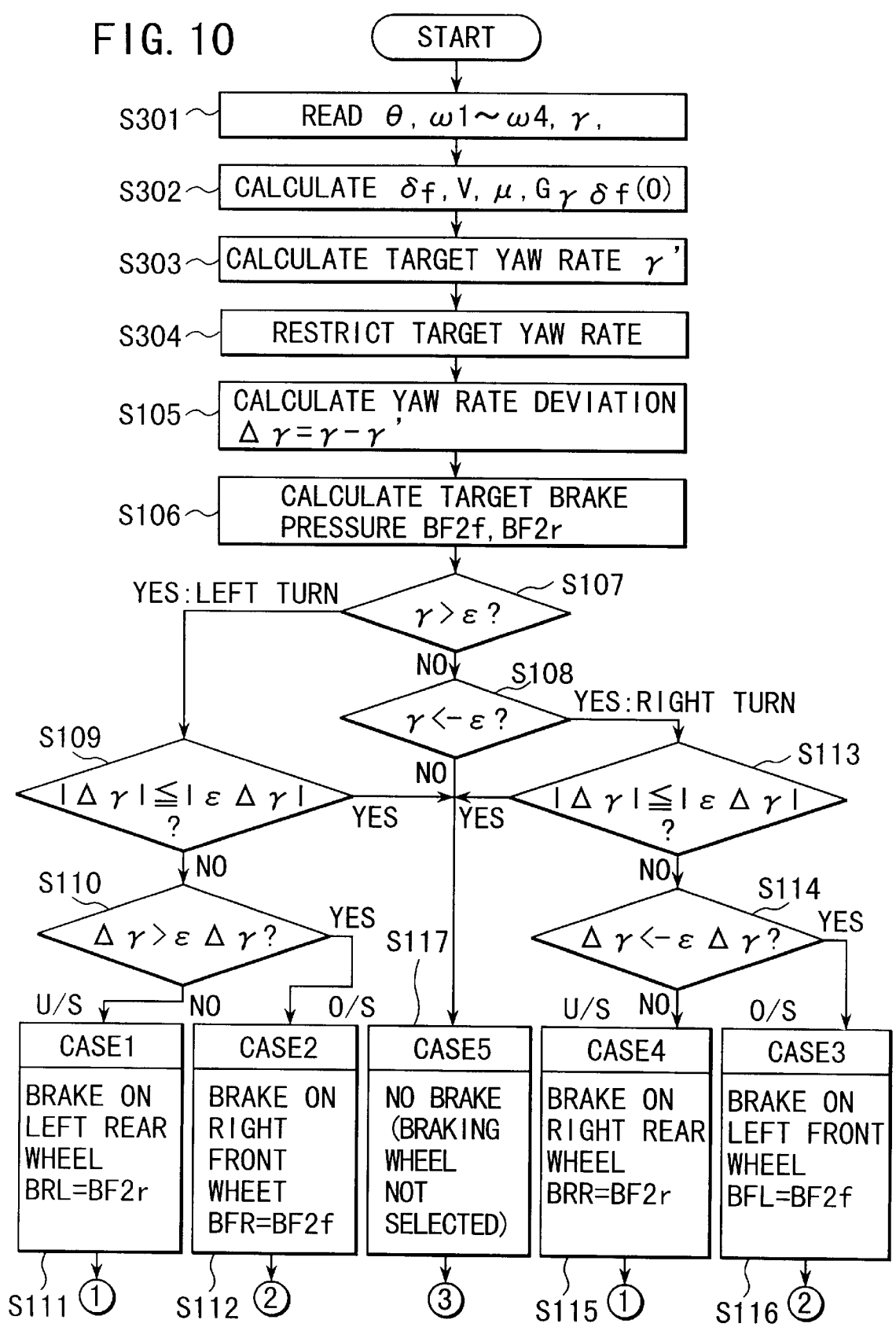
FIG. 10 is a flowchart of a braking force control according to a second embodiment of the present invention.
Figure 11:
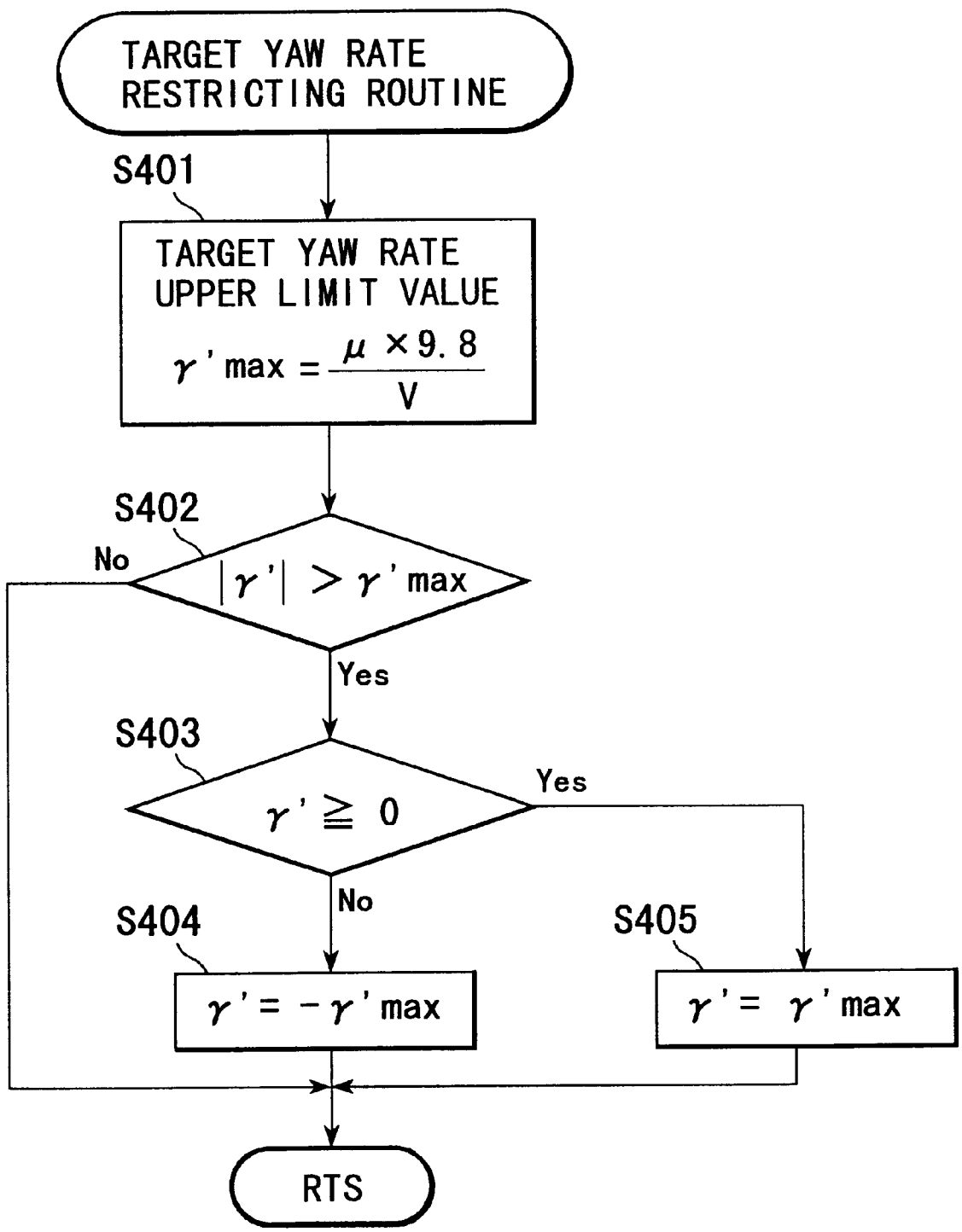
FIG. 11 is a flowchart of a target yaw rate restricting routine according to a second embodiment of the present invention.

Referring now to FIG. 9 to FIG. 11, these drawings are presented for describing a braking force control system according to a second embodiment of the present invention. The braking force control system according to the second embodiment includes road friction coefficient calculating means for calculating a fiction coefficient of a road surface. Based on this friction coefficient and the vehicle speed the target yaw rate restricting means restrict the magnitude of the absolute value of the target yaw rate. In the second embodiment, the lateral acceleration sensor 9 employed in the first embodiment is not needed.

The control apparatus 25 according to the second embodiment comprises, as shown in FIG. 9, a vehicle speed calculating section 11, a steering angle calculating section 12, a road friction coefficient estimating section 26, a yaw rate gain calculating section 13, a target yaw rate calculating section 14, a target yaw rate restricting section 27, a yaw rate deviation calculating section 16, a target braking force calculating section 17, a braking wheel determining section 18, an output judging section 19 and a brake signal outputting section 20.

The road friction coefficient estimating section 26 estimates a friction coefficient of a road surface $\mu$ according to the condition of a road surface by obtaining the cornering powers of the front and rear wheels, $CP_f$ and $CP_r$ as extended to the nonlinear area based on, for example, equations of yaw motion parameterizing the actual steering angle $\delta f$, the vehicle speed V and the actual yaw rate $\lambda$ and outputs the estimated friction coefficient $\mu$ to the target yaw rate restricting section 27.

The target yaw rate restricting section 27 restricts the absolute value of the target yaw rate $\lambda'$ calculated in the target yaw rate calculating section 14 to a value below the established upper limit value $\lambda'max$ and outputs the restricted yaw rate to the yaw rate deviation calculating section 16. The upper limit value c'max is calculated according to the following formula:

$$\lambda'_{max} = \mu \cdot G/V \tag{11}$$

where $\mu$ is a friction coefficient of a road surface; and G is gravitational acceleration.

The above formula (11) is obtained from the aforementioned formula (5) and the following formula (12).

$$YG = \mu \cdot G \tag{12}$$

According to the second embodiment, since the absolute value of the target yaw rate $\gamma'$ is restricted by the target yaw rate derived from the road friction coefficient $\mu$ in the target yaw rate restricting section 27, even when the vehicle driver turns a steering wheel excessively, the target yaw rate is not established to a value larger than required and as a result the vehicle is subjected to a proper braking force control.

Next, an operation of the braking force control system according to the second embodiment will be described with reference to a flowchart shown in FIG. 10.

The control program for the braking force control system is executed at a specified time interval (for example 10 milli-second) during running of the vehicle. When the program starts, at a step S301 a steering wheel angle $\theta$ is read from the steering wheel angle sensor 7, wheel speeds $\omega_1$, $\omega_2$, $\omega_3$, $\omega_4$ are read from the wheel speed sensors $6_{fl}$, $6_{fr}$, $6_{rl}$, $6_{rr}$ respectively, an actual yaw rate $\gamma$ is read from the yaw rate sensor 8 and the program goes to S302.

At S302 an actual steering angle $\delta_f$ is calculated from the steering wheel angle $\theta$ ($\delta f=\theta/N$) in the steering angle calculating section 12 and a vehicle speed V is calculated from the wheel speeds $\omega_1$, $\omega_2$, $\omega_3$, $\omega_4$ in the vehicle speed detecting section 11, a friction coefficient of road surface $\mu$ is estimated in the road friction coefficient estimating section 26. Further, a yaw rate gain $G_{\gamma\delta_f}(0)$ is calculated according to the aforementioned formula (1) in the yaw rate gain calculating section 13.

Then, the program goes to S303 in which a target yaw rate $\gamma'$ is calculated according to the formula (3) in the target yaw rate calculating section 14. After that, at S304 an absolute value of the target yaw rate $\gamma'$ calculated in the target yaw rate calculating section 14 is restricted to a value below the established upper limit value $\gamma'_{max}$. Hereinafter, steps are executed in the same manner as the flowchart shown in FIG. 4.

Next, the target yaw rate restricting routine executed at S304 will be described by a flowchart shown in FIG. 11. First, at S401 the upper limit value $\gamma'_{max}$ of the target yaw rate $\gamma'$ is set to $\gamma'_{max} = \mu \cdot G/V$ and then the program goes to S402 where the absolute value $|\gamma'|$ of the target yaw rate $\gamma'$ calculated in the target yaw rate calculating section 14 is compared with the above $\gamma'_{max}$. If the absolute value $|\gamma'|$ of the target yaw rate $\gamma'$ is smaller than $\gamma'_{max}$ ($|\gamma'| \leq \gamma'_{max}$), it is judged that the target yaw rate $\gamma'$ is within a range capable of performing a stable braking force control and the program goes out of the routine. On the other hand, the absolute value $|\gamma'|$ of the target yaw rate $\gamma'$ is larger than $\gamma'_{max}$ ($|\gamma'| > \gamma'_{max}$), it is judged that the target yaw rate $\gamma'$ has become large than needed due to a driver's excessive turning of the steering wheel and the program goes to S403, in which it is checked whether the target yaw rate $\gamma'$ is positive or negative. If it is negative ($\gamma'<0$), the program goes to S404 where the target yaw rate $\gamma'$ is set to $-\gamma'_{max}$ ($\gamma'=-\gamma'_{max}$) and then gets out of the routine. If it is positive ($\gamma' \geq 0$), the program steps to S405 where the target yaw rate $\gamma'$ is set to $\gamma'_{max}$ ($\gamma'=\gamma'max$) and goes out of the routine.

The target yaw rate restricting routine restricts the target yaw rate $\gamma'$ to a value below the upper limit value $\gamma'max$ capable of making a stable braking force control so as to prevent the target yaw rate from being established to a value larger than necessary.

In summary, according to the present invention, since the absolute value of the target yaw rate is restricted by the target yaw rate restricting means, the target yaw rate can be established to a reasonable value even if the vehicle driver turns the steering wheel excessively, thereby a stable control of the vehicle can be obtained regardless of a driver's skill.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A braking force control system of a vehicle, having a front wheel, a rear wheel, a front wheel cylinder for said front wheel, a rear wheel cylinder for said rear wheel and a brake drive apparatus for supplying and controlling a brake pressure to said front wheel cylinder and said rear wheel cylinder, vehicle speed detecting means for detecting a vehicle speed, and steering angle detecting means for detecting a steering angle, comprising:

actual yaw rate detecting means for detecting an actual yaw rate;

road friction coefficient estimating means for estimating a friction coefficient of a road surface based on said actual yaw rate, said steering angle and said vehicle speed;

yaw rate gain calculating means for calculating a yaw rate gain based on said vehicle speed;

target yaw rate calculating means for calculating a target yaw rate based on said vehicle speed, said steering angle and said yaw rate gain;

target yaw rate restricting means for restricting an absolute value of said target yaw rate to a value below an upper limit value based on said friction coefficient of a road surface and said vehicle speed and for outputting said value as a restricted target yaw rate;

yaw rate deviation calculating means for calculating a yaw rate deviation of said actual yaw rate and said restricted target yaw rate;

target braking force calculating means for calculating a target braking force based on said yaw rate deviation, said steering angle, said yaw rate gain, said vehicle speed and said actual yaw rate;

braking wheel determining means responsive to said actual yaw rate and said yaw rate deviation for selecting an inside rear wheel to be braked when a sign of said yaw rate deviation is different from the sign of said actual yaw rate due to an under-steering operation by a driver, and for selecting an outside front wheel to be braked when the sign of said yaw rate deviation is the same as the sign of said actual yaw rate due to an over-steering operation by said driver, and generating a selection signal;

output judging means for selectively determining a judging threshold value based on said yaw rate deviation, said actual yaw rate and said vehicle speed, for outputting a control signal so as to execute a braking force control when an absolute value of said yaw rate deviation is larger than said threshold value and for outputting a noncontrol signal so as to stop a braking force control when said absolute value of said yaw rate deviation is smaller than said threshold value; and brake signal outputting means responsive to said control signal for outputting a brake signal to said brake drive apparatus so as to apply said target braking force to said braking wheel and responsive to said noncontrol signal for stopping said brake signal to said brake drive apparatus.

2. The braking force control system according to claim 1, wherein said upper limit value of said target yaw rate restricting means is obtained by dividing a product of multiplication of said friction coefficient and gravitational acceleration by said vehicle speed.

3. The braking force control system according to claim 1, wherein said judging threshold value comprises a first threshold value and a second threshold value and said first threshold value is larger than said second threshold value.

4. The braking force control system according to claim 1, wherein either said first threshold value or said second threshold value is selectively used for said judging threshold value according to a sign of said yaw rate deviation.

5. The braking force control system according to claim 1, wherein said first threshold value and said second threshold value both become small with an increase of said vehicle speed.

6. The braking force control system according to claim 1, wherein said first threshold value becomes small with an increase of said vehicle speed and said second threshold value is constant with respect to said vehicle speed.

7. The braking force control system according to claim 1, wherein said first threshold value is constant with respect to said vehicle speed and said second threshold value becomes small with an increase of said vehicle speed.

8. A braking force control method of a vehicle, having a front wheel, a rear wheel, a front wheel cylinder for said front wheel, a rear wheel cylinder for said rear wheel and a brake drive apparatus for supplying and controlling a brake pressure to said front wheel cylinder and said rear wheel cylinder, comprising the steps of:

detecting a vehicle speed;

detecting a steering angle;

detecting an actual yaw rate;

estimating a friction coefficient of a road surface based on said actual yaw rate, said steering angle and said vehicle speed;

calculating a yaw rate gain based on said vehicle speed;

calculating a target yaw rate based on said vehicle speed, said steering angle and said yaw rate gain;

restricting an absolute value of said target yaw rate to a value below an upper limit value based on said friction coefficient of a road surface and said vehicle speed and outputting said value as a restricted target yaw rate;

calculating a yaw rate deviation of said actual yaw rate and said restricted target yaw rate;

calculating a target braking force based on said yaw rate deviation, said steering angle, said yaw rate gain, said vehicle speed and said actual yaw rate;

determining a braking wheel in response to said actual yaw rate and said yaw rate deviation for selecting an inside rear wheel to be braked when a sign of said yaw rate deviation is different from the sign of said actual yaw rate due to an under-steering operation by a driver, and for selecting an outside front wheel to be braked when the sign of said yaw rate deviation is the same as the sign of said actual yaw rate due to an over-steering operation by said driver selectively determining a judging threshold value based on said yaw rate deviation, said actual yaw rate and said vehicle speed, outputting a control signal so as to execute a braking force control when an absolute value of said yaw rate deviation is larger than said threshold value and outputting a noncontrol signal so as to stop a braking force control when said absolute value of said yaw rate deviation is smaller than said threshold value; and responsive to said control signal, outputting a brake signal to said brake drive apparatus so as to apply said target braking force to said braking wheel and responsive to said noncontrol signal, stopping said brake signal to said brake drive apparatus.

9. A braking force control system for a vehicle having, wheel speed detecting means for detecting a speed of each wheel of the vehicle and generating a wheel speed signal, steering angle detecting means provided near a steering wheel on said vehicle sensing a steering angle of said steering wheel and producing a steering angle signal, and a yaw rate detector detecting an actual yaw rate of the vehicle when negotiating a corner and generating a yaw rate signal, the control system further comprising:

a vehicle speed calculator responsive to said wheel speed signals, calculating vehicle speed and producing a vehicle speed signal;

yaw rate gain calculator responsive to said wheel speed signal, calculating a yaw rate gain and generating a yaw rate gain signal;

target yaw rate calculator responsive to said yaw rate gain signal and said steering angle signal, calculating a target yaw rate and generating a target yaw rate signal;

road friction estimating section responsive to said yaw rate signal, said steering angle signal and said vehicle speed signal, estimating a friction coefficient between the wheels of the vehicle and a road by calculating a cornering power thereof and producing a friction coefficient signal;

target yaw rate restricting means responsive to said target yaw rate signal, said friction coefficient signal and said vehicle speed signal to derive a restricting amount of said target yaw rate below an absolute value of said target yaw rate and generating a restricting signal;

yaw rate deviation section responsive to said yaw rate signal and said restricting signal for deriving a yaw rate difference and generating a yaw rate difference signal;

target braking force calculator responsive to said steering angle signal, said yaw rate signal, said yaw rate difference signal, said yaw rate gain signal and said vehicle speed signal so as to calculate target braking force for front wheels and rear wheels of the vehicle, respectively, and outputting a target braking force signal;

braking wheel discriminator responsive to said yaw rate signal and said yaw rate difference signal to select an inside rear wheel to be braked when a sign of said yaw rate difference is different form the sign of said actual yaw rate due to an under-steering operation by a driver, and for selecting an outside front wheel to be braked when the sign of said yaw rate difference is the same as the sign of said actual yaw rate to an over-steering operation by said driver and generating a selection signal;

power discriminator responsive to said yaw rate difference signal and said yaw rate signal to judge whether said yaw rate difference is within a predetermined controllable region or not and generating a judgment signal; and braking force output section responsive to said selection signal, said target braking force signal and said judgment signal to output a braking signal so as to control a braking force for each wheel of the vehicle at an optimum value corresponding to all vehicle running conditions, so as to effectively avoid said vehicle from spinning even when over-steering or under-steering a turn to improve stability of said vehicle without slipping even on slippery roads.

10. A braking force control system according to claim 9, wherein said power discriminator is further responsive to vehicle speed.

11. A braking force control system according to claim 10, further comprising a brake driver responsive to said braking signal for controlling respective wheel cylinders of the wheels of the vehicle for applying the corresponding braking force for each wheel.

12. The braking force control system according to claim 9, wherein;

said target yaw rate restricting means restricts an absolute value of said target yaw rate by calculating an upper limit based upon a result derived by multiplying said road friction coefficient by a gravitational acceleration value and dividing by said vehicle speed.

13. A braking force control system for a vehicle with wheels having, steering angle detecting means sensing a steering angle of a steering wheel of the vehicle and producing a steering angle signal, and a yaw rate detector detecting an actual yaw rate of the vehicle when negotiating a corner and generating a yaw rate signal, the control system further comprising:

a vehicle speed section producing a vehicle speed signal;

yaw rate gain calculator responsive to said wheel speed signal, calculating a yaw rate gain and generating a yaw rate gain signal;

target yaw rate calculator responsive to said yaw rate gain signal and said steering angle signal, calculating a target yaw rate and generating a target yaw rate signal;

road friction estimating section responsive to said yaw rate signal, said steering angle signal and said vehicle speed signal, estimating a friction coefficient between the wheels of the vehicle and a road by calculating a cornering power thereof and producing a friction coefficient signal;

target yaw rate restricting means responsive to said target yaw rate signal, said friction coefficient signal and said vehicle speed signal, deriving a restricting amount of said target yaw rate below an absolute value of said target yaw rate and generating a restricting signal;

yaw rate deviation section responsive to said yaw rate signal and said restricting signal to derive a yaw rate difference and generating a yaw rate difference signal;

target braking force calculator responsive to said steering angle signal, said yaw rate signal, said yaw rate difference signal, said yaw rate gain signal and said vehicle speed signal so as to calculate target braking force and outputting a target braking force signal;

braking force output section responsive to said target braking force signal to output a braking signal so as to control a braking force for each wheel of the vehicle at an optimum value corresponding to all vehicle running conditions so as to effectively avoid said vehicle from spinning even when over-steering or under-steering a turn to improve stability of said vehicle without slipping even on slippery roads; and wherein said braking force output section is responsive to said actual yaw rate and said yaw rate difference for selecting an inside rear wheel to be braked when a sign of said yaw rate difference is different from the sign of said actual yaw rate due to an under-steering operation by a driver, and for selecting an outside front wheel to be braked when the sign of said yaw rate difference is the same as the sign of said actual yaw rate due to an over-steering operation by said driver.

* * * * *